(12) United States Patent
Huber et al.

(10) Patent No.: US 6,215,215 B1
(45) Date of Patent: Apr. 10, 2001

(54) ELECTRIC MOTOR

(75) Inventors: Martin Huber, Oberkirch; Harold Bitzer; Wilhelm Braun, both of Buehl, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/402,629

(22) PCT Filed: Nov. 2, 1998

(86) PCT No.: PCT/DE98/03191

§ 371 Date: Oct. 7, 1999

§ 102(e) Date: Oct. 7, 1999

(87) PCT Pub. No.: WO99/40669

PCT Pub. Date: Aug. 12, 1999

(30) Foreign Application Priority Data

Feb. 7, 1998 (DE) .............................................. 198 05 003

(51) Int. Cl.[7] .............................. H02K 5/00; H02K 5/10; F04B 17/00
(52) U.S. Cl. ........................... 310/89; 310/86; 417/423.14
(58) Field of Search ................................ 310/89, 85, 86, 310/87, 88; 417/410.1, 423.1, 423.11, 423.12, 423.14

(56) References Cited

U.S. PATENT DOCUMENTS

| | | | |
|---|---|---|---|
| 3,746,472 | * 7/1973 | Rupp | 417/9 |
| 5,412,272 | * 5/1995 | Mensching | 310/88 |
| 5,564,909 | * 10/1996 | Rischen et al. | 417/273 |
| 5,742,109 | * 4/1998 | Volz et al. | 310/89 |

* cited by examiner

Primary Examiner—Nestor Ramirez
Assistant Examiner—Dang Dinh Le
(74) Attorney, Agent, or Firm—Ronald E. Greigg; Edwin E. Greigg

(57) ABSTRACT

An electric motor having a cup-shaped motor housing for containing a shaft and a motor cover that closes the motor housing. The motor cover has a peripheral section extending essentially radial to the shaft and an inner section extending essentially axial to the shaft. The inner section at least partially, radially encloses a bearing for supporting the shaft. The electric motor is fastened to a connecting block in order to be connected to a subassembly to be rotated by the shaft. The peripheral section of the motor cover and the connecting block touch each other on at least one support. The motor housing and the connecting block are axially clamped in relation to each other by means of a clamping element. The peripheral section of the motor cover is axially connected to the motor housing in detent fashion.

20 Claims, 3 Drawing Sheets

ELECTRIC MOTOR

PRIOR ART

The invention relates to an electric motor, for driving a pump unit.

The invention is based on an electric motor. DE 44 30 909 A1 has already disclosed an electric motor that is for driving a radial piston pump and is fastened to a connecting block for connecting the electric motor to the radial piston pump. The connecting block simultaneously constitutes the housing of the radial piston pump. In order to drive the pump pistons of the radial piston pump, a cam is embodied on the shaft of the motor. Inside a motor housing, the shaft supports an armature which cooperates with a stator in a known manner. The motor housing is embodied in the shape of a cup and, on the end face adjoining the connecting block, is closed by a motor cover. The motor cover has a peripheral section extending essentially radial to the shaft and an inner section extending essentially axial to the shaft. The inner section encloses an outer bearing shell of a ball bearing radially and on one side also axially. This ball bearing is one of a total of three bearings with which the shaft is supported in the motor housing, the motor cover, and the connecting block. The motor is fastened to the connecting block in such a way that the motor cover is screw connected to the connecting block.

With a known electric motor, the disadvantage is that it has a tendency to produce significant noise due to the rigid connection with the connecting block. In the known electric motor, it is also disadvantageous that the radial forces occurring in the middle bearing are not completely absorbed by the motor cover, which likewise contributes to noise production.

ADVANTAGES OF THE INVENTION

The pump unit according to the invention, has an advantage that the motor housing and the motor cover are prestressed by means of a clamping element. The motor cover can favorably compensate for existing manufacture-induced axial tolerances. Because the motor cover is clamped due to the detent connection of the peripheral section of the motor cover to the motor housing and due to the contact against the support, a force component that is directed radially outward is exerted on the inner section of the motor cover, which better fixes the bearing encompassed by the inner section. Radial forces that are exerted onto the bearing, particularly with the use of the electric motor in connection with a radial piston pump, therefore contribute significantly less to noise production.

Another advantage lies in the simplified manufacture of the electric motor. Since axial tolerances in the connection between the motor cover and the connecting block due to the axial clamping of the motor cover are largely prevented, significantly fewer demands have to be placed on the manufacture tolerances. This contributes to a reduction in production costs.

Advantageous improvements and updates of the electric motor are possible by means of the measures taken as set forth hereinafter.

The disposition of the support in the vicinity of the bearing enclosed by the inner section of the motor cover produces a particularly great lever arm with which the clamping force transmitted by the motor housing acts on the motor cover. Axial tolerances of the motor cover are thus compensated for in a particularly favorable manner. Furthermore, due to the favorable ratio of the lever arms, a relatively high radial force component is produced with which the inner section of the housing cover acts on the bearing that it radially encloses.

The clamping element is preferably comprised of locking screws which extend through the motor housing parallel to the shaft. The locking screws can be tightened from the outside by means of a suitable tool on the side of the motor housing disposed opposite from the connecting block. Preferably, the locking screws are disposed evenly around the circumference of the shaft. In this manner, the clamping force can be apportioned so that it is distributed over the circumference. If the inner section of the motor cover encompasses the bearing in a cup-shaped fashion, a particularly favorable contact is produced between the inner section and the outer bearing shell of the bearing.

In order to lock the motor cover in place, the motor housing can have a corresponding step, which can be manufactured in a particularly simple and inexpensive manner in the mass production, e.g. by means of caulking or stamping. Preferably, a sealing means for sealing the gap is provided between the connecting block and the outer circumference of the peripheral section of the motor cover and/or the motor housing. In this fashion, moisture and impurities are prevented from penetrating into the gap. The sealing means can be inserted into a contour hollow between the motor housing and the motor cover or can be inserted into a concavity provided for this, which enlarges the contour hollow. An additional or alternative sealing means can also be provided in the vicinity of the support. In this connection, the support can be embodied as an axial projection of the motor cover and a first sealing means can be provided radially inside the axial projection of the motor cover and a second sealing means can be provided radially outside this projection. The sealing means can in particular be inserted into a contour hollow that is embodied at the transition from the peripheral section to the inner section of the motor cover.

Preferably the sealing means is comprised of a hardening sealing medium, such as silicone. Preferably in the as yet unhardened state, the sealing medium is applied to the motor cover, the motor housing, or the connecting block before these parts are assembled. This produces a particularly tight seal between the components and additionally damps the transmission of vibrations, which further reduces the noise emission of the motor. Alternatively, elastic sealing rings, e.g. O-rings, can be used as the sealing means.

The inner section of the motor cover can advantageously be embodied as conical at least in a partial region and can cooperate with a correspondingly conical section of a bore of the connecting block, which bore contains the inner section of the motor cover. In particular, this has the advantage that a part of the radial bearing forces of the bearing, which is radially enclosed by the inner section of the motor cover, are introduced directly into the connecting block and consequently, a particularly good radial support of the bearing is produced. This also counteracts noise emission.

BRIEF DESCRIPTION OF THE DRAWINGS

Exemplary embodiments of the invention are shown in a simplified fashion in the drawings and will be explained in detail in the subsequent description.

DESCRIPTION OF THE EXEMPLARY EMBODIMENTS

Figure 1:
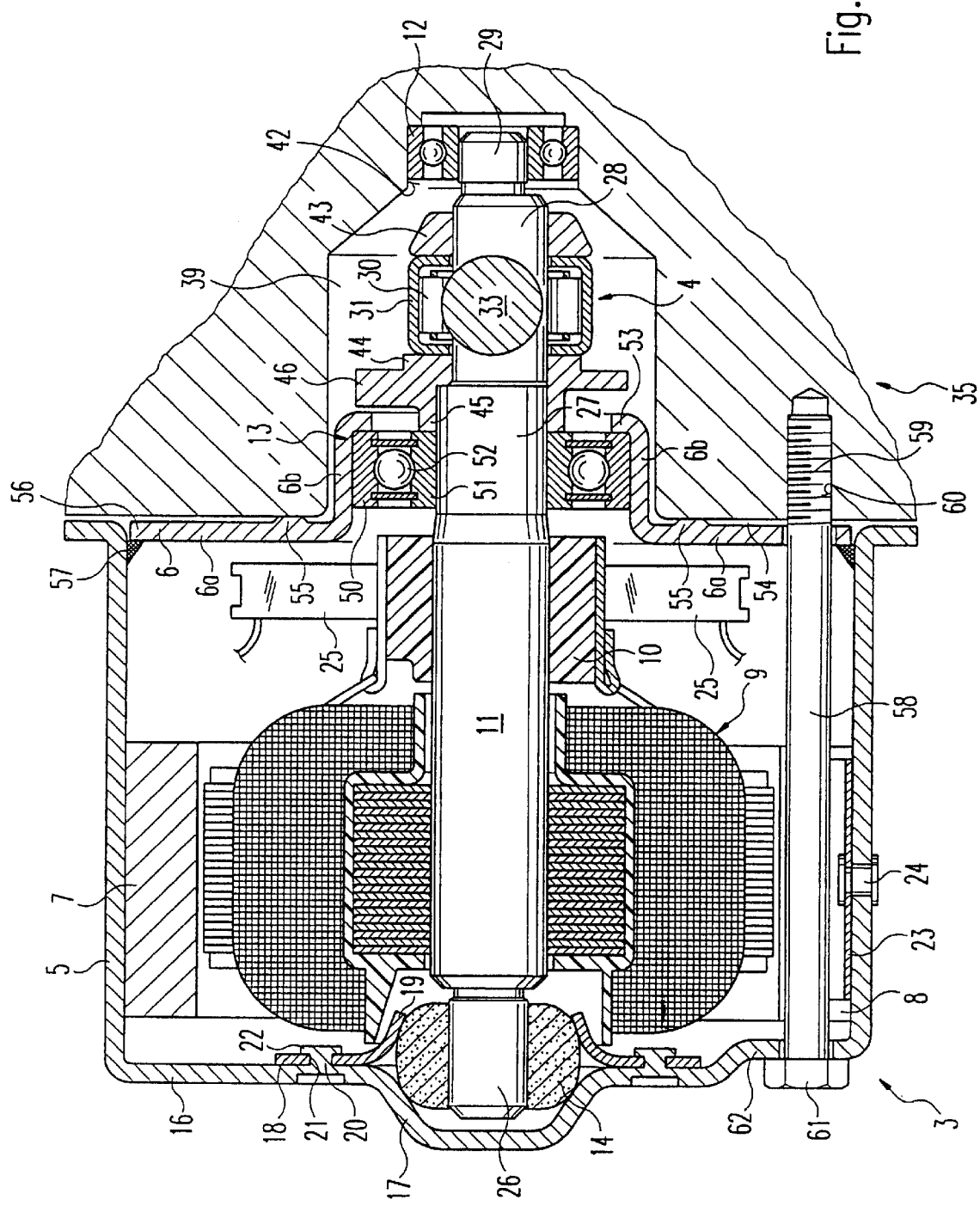
FIG. 1 shows a longitudinal section through an electric motor according to the invention and a radial piston pump connected to the electric motor.

FIG. 1 shows a section through the electric motor 3 according to the invention, which in the exemplary embodiment shown, is used to drive a radial piston pump 4.

The electric drive motor 3 has an essentially cup-like motor housing 5, a motor cover 6, a stator comprised of at least two permanent magnets 7, 8, an armature 9 with an associated commutator 10, a shaft 11 that carries the armature 9 and the commutator 10 and is supported so that the shaft can rotate in three bearings 12, 13, and 14. The bearings 13 and 12 are embodied as a ball bearing. In the exemplary embodiment, the bearing 14 is embodied as a slide bearing. For example, this slide bearing 14 is a sintered metal bearing whose pore spaces are filled with a lubricant such as lubrication oil that is highly resistant to aging. For this purpose, an end wall 16 of the cup-like motor housing 5 has a recess 17, which is produced by means of pressing or deep drawing, into which the bearing 14 protrudes. In order to secure the bearing 14 in place in the recess 17, a securing block 18 is provided, which has resilient tabs 19 that press against the bearing 14. For example, the securing block 18 is riveted to the end wall 16. This can for example take place in the known manner such that so-called riveting pins 20 are formed out of the material of the end wall 16, and these pins protrude through holes 21 disposed in the securing plates 18 and are deformed into rivet heads 22.

At least one securing spring 23 is provided in order to secure the at least one permanent magnet 7 or 8 in place in the cup-like housing 5. This securing spring 23 is fixed in relation to the cup-like motor housing 5 by means of a securing pin 24. The commutator is associated with at least two carbon brushes 25. The carbon brushes 25 are guided in tubular brush holders, not shown.

In order to be supported in the slide bearing 14, the shaft 11 has a shaft pin 26 protruding from the armature 9. Inside the ball bearing 13, the shaft 11 has a cylindrical section 27. In the direction toward the ball bearing 12, this cylindrical section 27 is followed by a cam 28. As can be seen in FIG. 1, in the exemplary embodiment, the cam 28 is embodied of one piece with the shaft 11 and is disposed inside the projection of the cylindrical section 27. The cam 28 is adjoined by another shaft pin 29 of the shaft 11. In the current exemplary embodiment, the cam 28 is encompassed by bearing needles 30 around which a bearing ring 31 extends. A number of pistons 33 can be moved by means of the cam 28 with the interposition of the bearing needles 30 and the bearing ring 31. A connecting block 35 is provided for connecting electric motor 3 to the radial piston machine 4. The connecting block 35 has at least one threaded hole 36. The housing 35 has a cam chamber 39 so that the cam 28 can move inside the connecting block 35. The cam chamber 39 is adjoined by a bore 42 into which the ball bearing 12 is inserted. This presents the possibility that the ball bearing 12 is seated in a stationary fashion in this bore 42 and the shaft pin 29 can move in relation to the ball bearing 12 or vice versa.

In an axial alignment in relation to the cam 28, the bearing needles 30 and the bearing ring 31 are secured by means of a stop ring 43, which is press fitted onto the cam 28 and by means of an additional stop ring 44, which transitions into a hub 45 and is fixed to the cylindrical section 27 of the shaft by means of this hub. Since according to FIG. 1, the cam 28, the bearing needles 30, and the bearing ring 31 clearly constitute an imbalance, a counterweight 46 is formed onto the hub 45. In this connection, the counterweight 46 is dimensioned so that the dimensions of the pump pistons 33 can be at least partially compensated for.

It should be additionally emphasized that the cam 28 does not have to be embodied as shown in FIG. 1 so that it is of one piece with the shaft 11 and is disposed between the shaft pin 29 and a cylindrical section 27 of the shaft 11. Rather, there is also the possibility embodying the cam 28 in the form of an eccentric bushing, mounting it over a cylindrical section of the shaft 11, and securing it against rotation relative to the shaft 11. This can take place, for example, by means of press fitting the cam 28 onto the shaft 11.

When the electric drive motor 3 is switched on, the armature 9 rotates the shaft 11 so that the cam 28 and the bearing ring 31 execute an eccentric rotational movement and therefore act in opposition to the pump pistons 33. When the pump pistons 33 are respectively moved away from the longitudinal axis of the shaft 11, pressure is produced in pump cylinders that are not shown.

The electric motor 3 according to the invention is suited not only for driving radial piston pumps or other pumps but is also suited in the same manner for driving other subassemblies.

The motor cover 6 has a peripheral section 6a extending essentially radial to the shaft 11 and an inner section 6b extending essentially axial to the shaft 11. The inner section 6b radially encloses the bearing 13. The bearing 13, which is embodied as a ball bearing, includes an outer bearing shell 50 and an inner bearing shell 51, which rotates together with the shaft 11. The ball bearings 52 are disposed between the bearing shells 50 and 51. The inner section 6b of the motor cover 6 radially encloses the outer bearing shell 50 and has an inwardly directed projection 53.

According to the invention, at least the peripheral section 6a of the motor cover 6 is spaced apart from the connecting block 35 by means of a gap 54 and the peripheral section 6a of the motor cover 6 and the connecting block 35 touch each other only on a support 55. The support 55 in the exemplary embodiment shown is constituted by means of an axial projection of the peripheral section 6a of the motor cover 6, which projection is produced e.g. by means of caulking or stamping. The axial projection preferably extends in an annular shape. However, it is also possible to embody the axial projection in point form by means of a corresponding stamping tool and to dispose several, at least three such stamping points so that they are distributed evenly on the circumference of the peripheral section 6a of the motor cover 6. In the preferred exemplary embodiment shown in FIG. 2, the gap 54 also extends between the connecting block 35 and the inner section 6b of the motor cover 6 so that the motor cover 6 touches the connecting block 35 only at the support 55.

The outer circumference 56 of the peripheral section 6a of the motor cover 6 is connected in detent fashion to a buttress 57 of the motor housing 5, which buttress is only shown in schematic form in FIG. 1. Furthermore, at least one, but preferably a number of locking screws 58 are provided. The locking screws 58 extend through the motor housing 5 parallel to the shaft 11. With the preferable use of a number of locking screws 58, these are disposed distributed around the circumference of the motor housing 5. The locking screws 58 have a thread 59, which can be screwed into a corresponding threaded bore 60 of the connecting block 35. The screw head 61, which is disposed at the opposite end from the thread 59, is supported against a flattening 62 of the end wall 16 of the motor housing 5.

When the locking screw 58 or the several locking screws 58 are tightened, the motor housing 5 and the connecting block 35 are axially clamped in relation to each other. As a result, the peripheral section 6a of the motor cover 6 is acted on in the direction toward the connecting block 35 with an axial force component by way of the buttress 57. Since the motor cover 6 rests against the support 55, a lever action is produced which acts in a radially inward direction on the inner section 6b of the motor cover 6. The bearing 13 is therefore acted on with a radial force component and is thus securely connected to the shaft 11 in detent fashion. Noise emissions coming from the bearing 13 are reduced to a minimum.

The axial clamping of the motor housing 5 to the connecting block 35 produces an axial pressure which likewise counteracts noise emissions to a considerable degree. Due to the gap 54 and the relatively long lever arm between the buttress 57 and the support 55, the locking screws 58 prestress the motor housing 5 with sufficient intensity in relation to the connecting block 35. This is favorable for the transmission of radial forces between the motor housing 5 and the connecting block 35 by means of frictional engagement.

Figure 2:
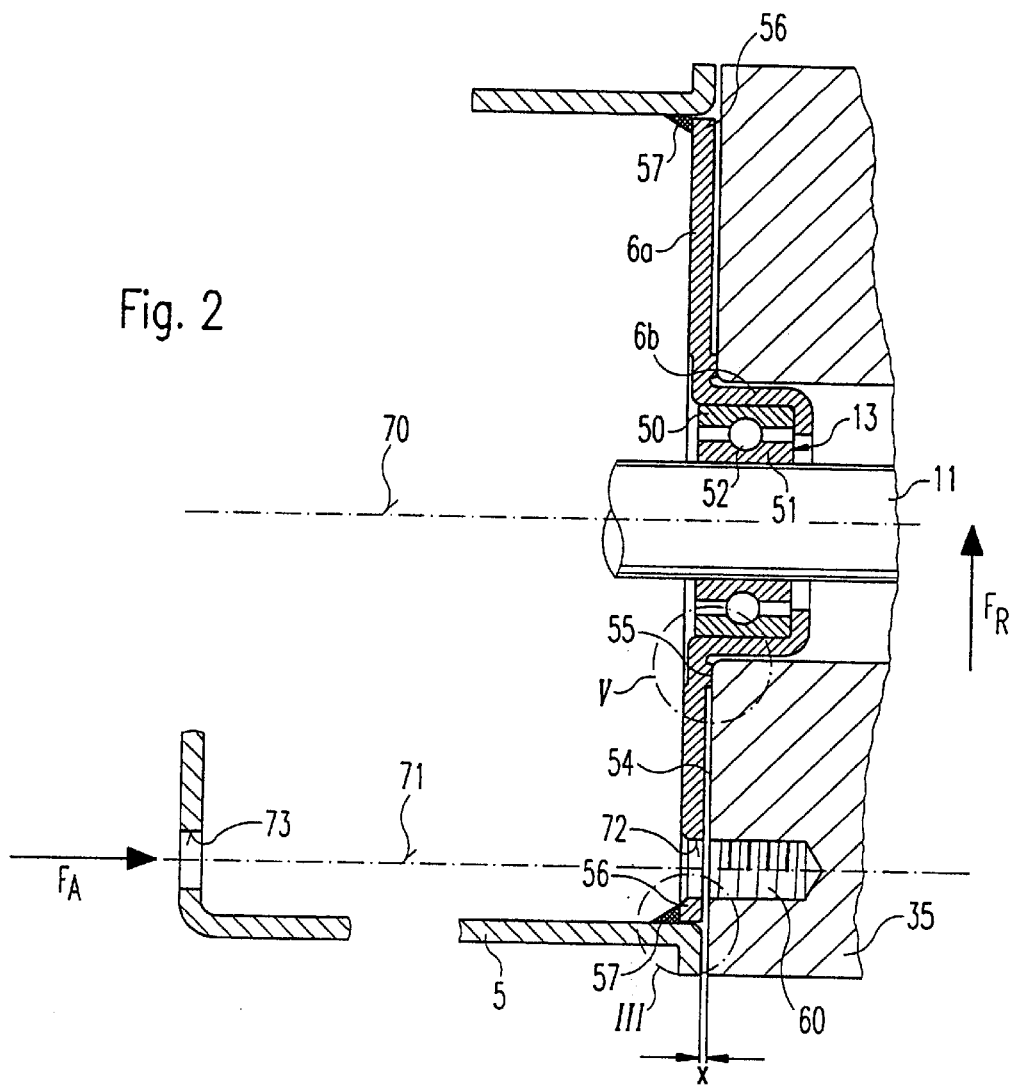
FIG. 2 is a schematic sectional depiction of the connection between the electric motor according to the invention and a connecting block.

FIG. 2 shows a detail from the exemplary embodiment shown in FIG. 1, in a schematic depiction in order to better clarify the operation of the embodiment according to the invention. Elements that have already been described are provided with the same reference numerals so that a repeat description in this regard is not necessary.

The locking screw 58, which is not shown in FIG. 2, extends along a screw axis 71 that runs through the motor housing 5 parallel to the rotational axis 70 of the shaft 11. The locking screw 58 extends through bore 72 in the peripheral section 6a of the motor cover 6 and through an additional bore 73 in the end wall 16 of the motor housing 5. In the preferred exemplary embodiment shown in FIGS. 1 and 2, the support 55 is disposed in the immediate vicinity of the bearing 13 in order to increase the lever action by means of the longest possible lever arm between the support 55 and the buttress 57.

Figure 3:
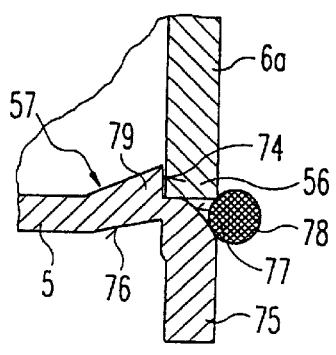
FIG. 3 is an enlarged depiction of the detail III in FIG. 2.

FIG. 3 shows a detail III of the exemplary embodiment shown in FIG. 2, in the vicinity of the buttress 57. As can be seen from FIG. 3, the buttress 57 is constituted by means of a caulking 79. To this end, a caulking or stamping tool engages the outside 76 of the motor housing 5 and caulks the wall of the motor housing 5 inward so that a step 74 is produced in the wall of the motor housing 5 against which step the outer circumference 56 of the peripheral section 6a of the motor cover 6 rests. The end 75 of the motor housing 5 is angled outward so that a contour hollow 77 is produced. A sealing medium 78, preferably in the form of a hardening paste-like sealing medium such as silicone can be introduced into the contour hollow 77. FIG. 3 shows a bead made of such a sealing medium. The paste-like sealing medium is introduced into the contour hollow 77 before the assembly of the motor housing 5 and the motor cover 6 with the connecting block 35. In lieu of a paste-like, hardening sealing medium, though, for example a sealing ring made of an elastic material can also be used as a sealing means, in particular an O-ring. The sealing means seals the gap 54 against moisture and contamination.

FIG. 2 shows the axial force component $F_A$ that is exerted by the locking screw 58 and prestresses the motor housing 5 in relation to the connecting block 35. As described above, by means of the motor cover 6 embodied according to the invention, a radial force component $F_R$ is exerted onto the bearing 13 so that the bearing 13 is detent connected to the shaft 11 in a secure, low-noise fashion.

FIG. 2 also shows the gap width x of the gap 54. The motor housing 5 can be clamped in relation to the connecting block 35 arbitrarily within the span determined by the gap width x, wherein the motor cover 5 predetermines a flat spring characteristic curve for the clamping. The axial force component $F_A$ can therefore be arbitrarily adapted to the given requirements.

Figure 4:
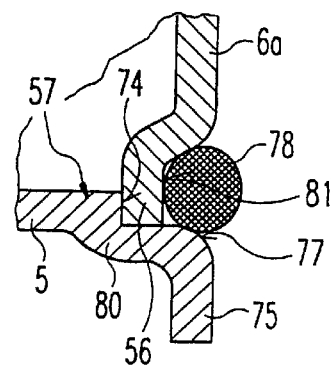
FIG. 4 shows the detail depicted in FIG. 3 of a modified exemplary embodiment.

FIG. 4 shows an exemplary embodiment that has been modified in relation to FIG. 3. FIG. 4 likewise shows the vicinity of the detail III in FIG. 2. In contrast to the exemplary embodiment shown in FIG. 3, in the exemplary embodiment according to FIG. 4, the buttress 57 is constituted by an outwardly directed caulking 80. The caulking 80 produces a step 74 on the wall of the motor housing 5, against which step the outer circumference 56 of the peripheral section 6a of the motor cover 6 rests. Another difference from the exemplary embodiment shown in FIG. 3 is comprised in that the peripheral section 6a of the motor cover 6 has a concavity 81 on its outer circumference 56, which enlarges the contour hollow 77. The containing space for containing the sealing means 77 is therefore enlarged and a larger bead of a pasty sealing medium can be applied.

The pasty sealing medium is used when wet, i.e. is applied in the as yet unhardened state, and the assembly of the motor housing 5, the motor cover 6, and the connecting block 35 likewise occurs when the pasty sealing medium has not yet been hardened.

Figure 5:
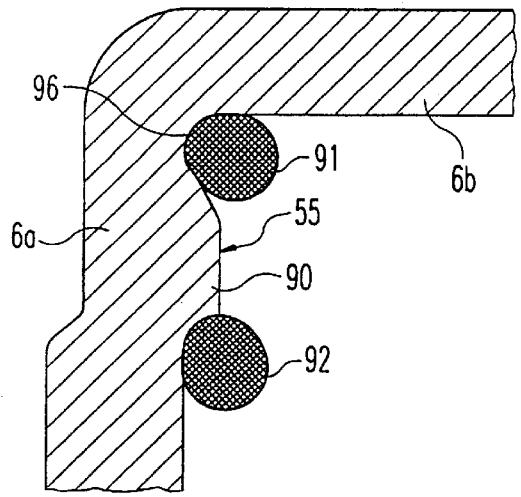
FIG. 5 is an enlarged depiction of the detail V in FIG. 2.
Figure 6:
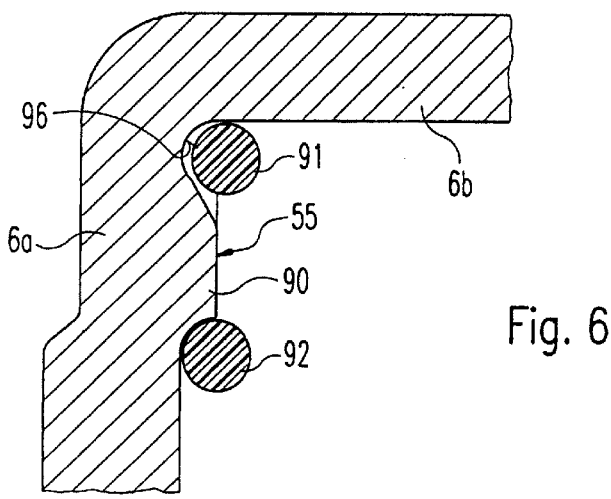
FIG. 6 shows the detail depicted in FIG. 5 of a modified exemplary embodiment.

FIGS. 5 and 6 each show a detail in the region V of FIG. 2, i.e. in the vicinity of the support 55. In the exemplary embodiments shown in FIGS. 5 and 6, the support is respectively embodied by means of an axial projection 90 which can be produced, e.g. by means of stamping or caulking. In the exemplary embodiments shown in FIGS. 5 and 6, a first sealing means 91 is disposed radially inside the axial projection 90 and a second sealing means 92 is disposed radially outside the axial projection 90. In the exemplary embodiment shown in FIG. 5, the sealing means 91, 92 is a pasty, hardening sealing medium, in particular silicone. A bead of the pasty sealing medium is respectively applied radially inside and radially outside the projection 90. The hardening takes place after the assembly of the motor cover 6 and the connecting block 35.

Alternatively, in the exemplary embodiment shown in FIG. 6, the sealing means 91 and 92 are each comprised of an elastic sealing ring, in particular an O-ring. Naturally, the exemplary embodiments shown in FIGS. 3 to 6 can be arbitrarily combined with one another. A contour hollow 96 into which the first sealing means 91 is introduced can be embodied at the transition between the peripheral section 6a and the inner section 6b of the motor cover 6.

Figure 7:
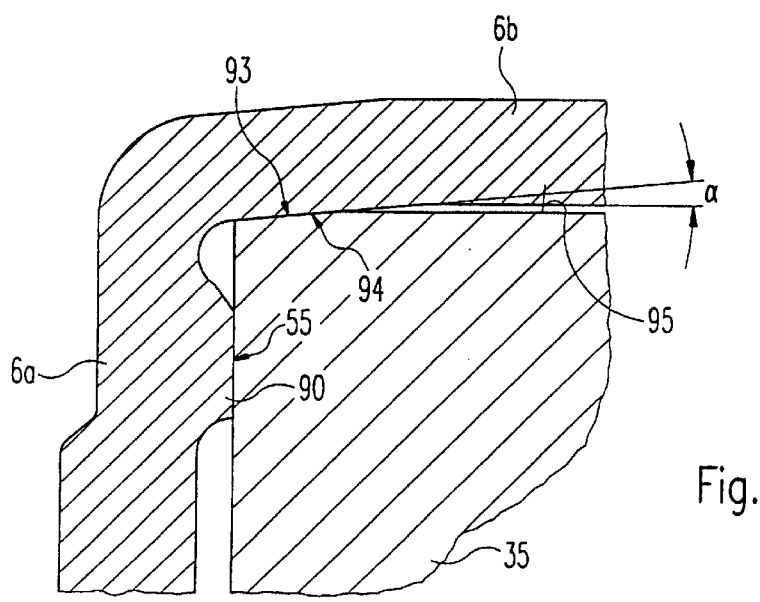
FIG. 7 shows the detail depicted in FIG. 5 of an additional modified exemplary embodiment.

In the exemplary embodiment shown in FIG. 7, the support 55 is also embodied as an axial projection 90, which can likewise be produced by means of caulking or stamping. The exceptional feature of this exemplary embodiment is comprised in that the inner section 6b of the motor cover 6 is embodied as conical in a partial region 93 and tapers conically in the direction of the peripheral section 6a of the motor cover 6. The conical section 93 of the inner section 6a of the motor cover 6 cooperates with a conical section 94 of a bore 95 of the connecting block 35 that contains the inner section 6a of the motor cover 6. The conical section 94 of the connecting block 35 widens in the direction of the peripheral section 6a of the motor cover so that the conical partial region 93 of the inner section 6b of the motor cover 6 lies flush against the conical section 94 of the connecting block 35. If the motor cover 6 is acted on with the axial force component $F_A$, the inner section 6b is pressed inward so that the bearing 13 is acted on with a radial force component. In so doing, the inclination angle α must be adapted to the optimal force transmission. By means of the prestressing force, the motor cover 6 is secured to the connecting block 35 in a play-free fashion, even when there are temperature differences and different coefficients of expansion among the components. Furthermore, a part of the radial bearing forces of the bearing 13 can be introduced directly into the connecting block 35.

The foregoing relates to a preferred exemplary embodiments of the invention, it being understood that other variants and embodiments thereof are possible within the spirit and scope of the invention, the latter being defined by the appended claims.

What is claimed is:

1. An electric motor (3) comprising a cup-shaped motor housing (5) for containing a shaft (11), and a motor cover (6) that closes the motor housing (5), said motor cover (6) has a flat peripheral section (6a) extending essentially radial to the shaft (11) and an inner section (6b) integral with said flat peripheral section (6a) extending essentially axial to the shaft (11), said inner section (6b), at least partially, radially encloses a bearing (13) for supporting the shaft (11), wherein the electric motor (3) is fastened to a connecting block (35) in order to be connected to a subassembly (4) to be rotated, the peripheral section (6a) of the motor cover (6) and the connecting block (35) touch each other in a non-fixed relationship on at least one support (55) which is disposed in a vicinity of the bearing (13) that is encompassed by the inner portion (6b) of the motor cover (6) and that the motor housing (5) and the connecting block (35) are axially clamped in relation to each other by means of a clamping element (58), the clamping element (58) that clamps the motor housing (5) and the connecting block (35) axially against each other is provided with a radial spacing outside of the support (55), wherein the peripheral section (6a) of the motor cover (6) is axially connected to the motor housing (5) by a buttress (57).

2. The electric motor according to claim 1, in which the clamping element (58) is disposed radially on a side of the support (55) remote from the shaft (11) and clamps the motor cover (6) to the connecting block (35).

3. The electric motor according to claim 2, in which the clamping element is comprised of at least one locking screw (58), which extends through the motor housing (5) parallel to the shaft (11) and is received by a threaded bore (60) of the connecting block (35).

4. The electric motor according to claim 2, in which the bearing (13) is a roller bearing and the inner section (6b) of the motor cover (6) encompasses an outer bearing shell (50) of the roller bearing in a cup shape.

5. The electric motor according to claim 2, in which an outer circumference (56) of the peripheral section (6a) of the motor cover (6) is axially connected to a step (74) of the motor housing (5).

6. The electric motor according to claim 1, in which the clamping element is comprised of at least one locking screw (58), which extends through the motor housing (5) parallel to the shaft (11) and is received by a threaded bore (60) of the connecting block (35).

7. The electric motor according to claim 6, in which the bearing (13) is a roller bearing and the inner section (6b) of the motor cover (6) encompasses an outer bearing shell (50) of the roller bearing in a cup shape.

8. The electric motor according to claim 6, in which an outer circumference (56) of the peripheral section (6a) of the motor cover (6) is axially connected to a step (74) of the motor housing (5).

9. The electric motor according to claim 1, in which the bearing (13) is a roller bearing and the inner section (6b) of the motor cover (6) encompasses an outer bearing shell (50) of the roller bearing in a cup shape.

10. The electric motor according to claim 9, in which an outer circumference (56) of the peripheral section (6a) of the motor cover (6) is axially connected to a step (74) of the motor housing (5).

11. The electric motor according to claim 1, in which an outer circumference (56) of the peripheral section (6a) of the motor cover (6) is axially connected to a step (74) of the motor housing (5).

12. The electric motor according to claim 11, in which the peripheral section (6a) of the motor cover (6) is spaced apart from the connecting block (35) by a gap (54) between the connecting block (35) and the outer circumference (56) of the peripheral section (6a) of the motor cover (6) or the motor housing (5), a sealing means (78) is provided which seals the gap (54).

13. The electric motor according to claim 12, in which the sealing means (78) is introduced into a contour hollow (77) between the motor housing (5) and the motor cover (6) or into a concavity (81) provided on the outer circumference (56) of the peripheral section (6a) of the motor cover (6).

14. The electric motor according to claim 13, in which the support (55) is disposed adjacent to a sealing means (91, 92).

15. The electric motor according to claim 12, in which the support (55) is disposed adjacent to a sealing means (91, 92).

16. The electric motor according to claim 15, in which the support (55) is constituted by an axial projection (90) of the peripheral section (6a) of the motor cover (6) and a first sealing means (91) is disposed radially inside the axial projection (90) and a second sealing means (92) is disposed radially outside the axial projection (90).

17. The electric motor according to claim 16, in which a contour hollow (96), into which the first sealing means (91) is introduced, is embodied on the motor cover (6) at the transition from the peripheral section (6a) to the inner section (6b).

18. The electric motor according to 12, in which the sealing means (78, 91, 92) are comprised at least in part by means of a hardening sealing silicone medium, which is applied in an as yet unhardened state before the assembly of the connecting block (35) with the motor cover (6) and the motor housing (5).

19. The electric motor according to claim 12, in which the sealing means (78, 91, 92) are each embodied at least in part by an elastic sealing ring.

20. The electric motor according to claim 1, in which the inner section (6b) of the motor cover (6) is embodied as conical at least in a partial region (93) and cooperates with a conical section (94) of a bore (95) of connecting block (35) that contains the inner section (6b) of the motor cover (6).

* * * * *